Feb. 12, 1929.
A. MOORE
1,701,538
HIGH TURBULENCE POWER CHAMBER FOR INTERNAL COMBUSTION ENGINES
Filed Feb. 21, 1927
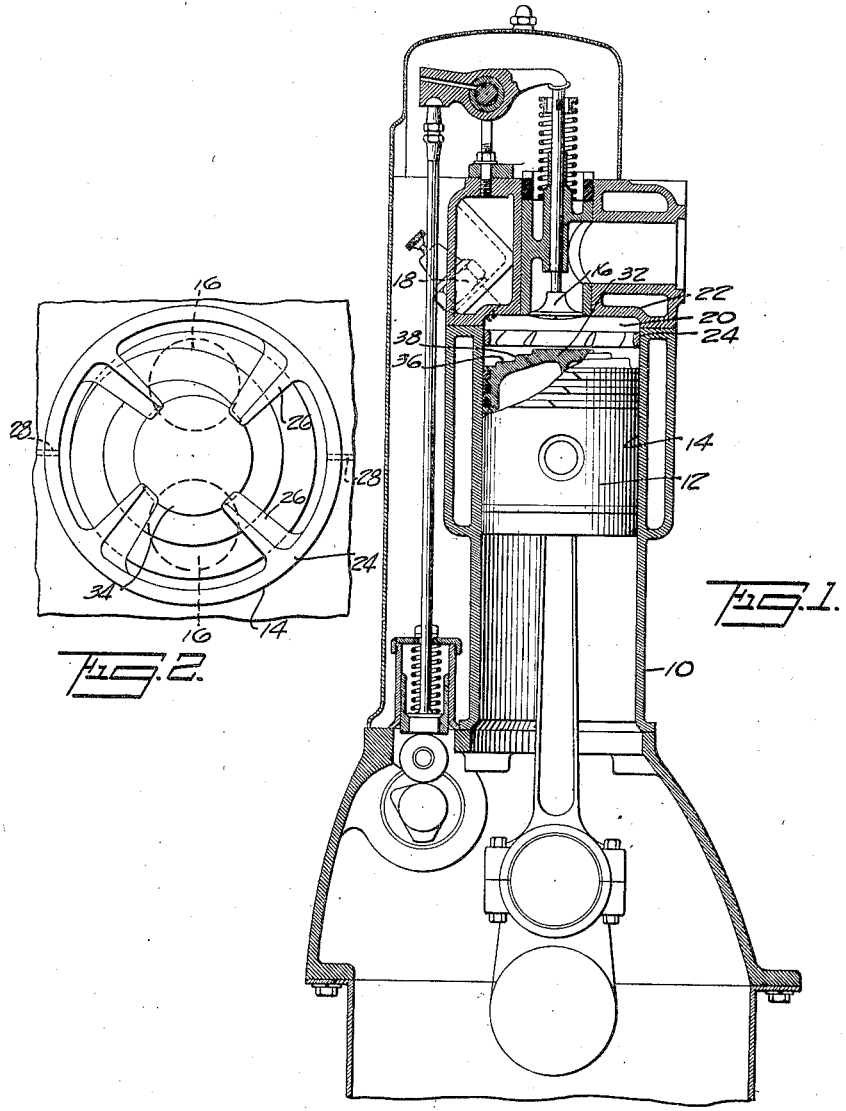
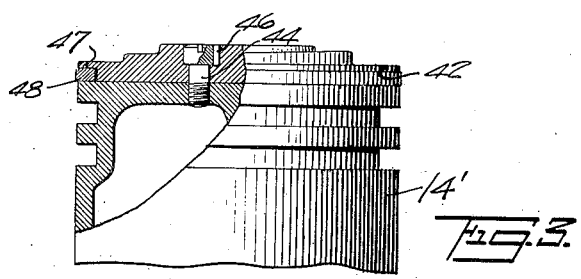
INVENTOR
Arlington Moore
BY
H. H. Dyke
ATTORNEY Patented Feb. 12, 1929.

1,701,538

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

HIGH-TURBULENCE POWER CHAMBER FOR INTERNAL-COMBUSTION ENGINES.

Application filed February 21, 1927. Serial No. 169,825.

My invention is of an internal combustion engine in which the power chamber in which the gases are confined during combustion is constructed to put the confined gases into a state of high turbulence to secure effective heat transfer from cycle to cycle and to prevent detonation by breaking up pressure waves.

The invention has especial adaptability to a valve-in-head engine in which the power chamber is substantially a continuation of the cylinder bore, and while the invention is not confined to such engines, I herein illustrate its application to such engines for the reason that I have found engines so constructed prone to stagnation of the cylinder contents, and that it is much more difficult to put the gases therein into a high state of turbulence and homogeneity of admixture than is the case, for example, in an engine of the L-head type, having valve pockets forming lateral extensions beyond the confines of the cylinder bore, and resulting greater freedom for sweeping circulatory movement of the confined gases.

With these or other engines requiring resort to unusually effective means to obtain desirably high turbulence, I provide the piston head of a formation adapted to produce agitation of the gases upon up and down piston movement, and I also interpose stationary deflector means in the combustion chamber over the piston head, and by making use of such reciprocatory and stationary agitating means in combination, am enabled by their coaction to secure homogeneity of admixture of charge components and violence of agitational movement many times more violent and much more highly effective than is obtainable in such engines with either of such means, when resorted to alone and in the absence of the other.

A further object of the invention is the provision of simple accessory equipment for obtaining high turbulence in the manner above referred to, and at the same time cutting down the clearance volume so as to give the increased compression ratios which are thereby made available for use without detonation.

A further object of the invention consists in the provision of the piston head with a separately attached crown having an extra piston ring associated therewith and adapted to secure efficient heat transfer from the cap or crown on the piston to the jacket walls.

In the accompanying drawings illustrating the embodiment of my invention in a four-cycle internal combustion engine for consuming volatile liquid fuel, Fig. 1 is a vertical cross-sectional view of a valve-in-head engine constructed to embody my invention. Fig. 2 is a fragmentary plan view with the cylinder head removed, and Fig. 3 is a side view, partly in section, of a piston and an attached helicoidal crown or cap having an extra piston ring associated therewith.

The engine 10 shown has a piston 12 reciprocating in the cylinder bore 14, overhead valves 16, arranged side by side, as indicated in dotted lines in Fig. 2, spark plug 18, and combustion chamber 20, shown as consisting principally of an upward extension of the cylinder bore 14, the cylinder head 22 shown being practically a mere cover for the combustion chamber and containing substantially only the ceiling walls thereof. This is, of course, but one of various engine constructions with which the invention can be made use of.

The stationary agitator means illustrated comprises a ring 24 inserted in the combustion chamber over the upper limit of piston travel, and provided with a plurality of radially inwardly extending inclined vanes 26, 26. The ring 24 may be secured in place as by means of pins 28, though no more than a snug force fit is necessary because of its expansion when heated.

The piston head is provided with a helicoidal upward projection 32 highest at the center, as indicated at 34, and having the central plateau 34 surrounded by several spiral or volute ramp and riser convolutions indicated by reference numerals 36 and 38 respectively.

The helicoidal head extension may be in-built in making the piston, as indicated in Fig. 2; but for an accessory installation in old engines, along with the agitator vane ring 24, it is preferably embodied in a cap or crown 42, attached to the head of piston 14' by a plurality of screws 44, which screws are preferably locked in place by pins or dowels 46, driven into a hole drilled half in the screw head and half in the metal of the cap, after which the metal is peened over above the dowel so that the dowel can not come out.

The helicoidal crown 42 is preferably provided with an undercut recess 47 formed in its outer and lower marginal portion, which with the piston head provides a groove for reception of a piston ring 48. Provision of such piston ring and its close contact with the water jacketed cylinder wall and also with the metal of crown 42 provides for effective heat transfer from the accessory piston head crown to the cylinder walls.

The stationary vaned agitator and the reciprocating helicoidal piston head agitator coact to produce extremely violent turbulent movement of the confined gases.

The helicoidal piston head extension is adapted to produce a cyclonic agitation of the gases as they follow the piston down, and a reverse cyclonic movement therein as the gases are driven up by the piston on the up strokes thereof. Likewise the inclined vanes 26 are adapted to impart cyclonic agitational movement in one direction on the down stroke, and in the reverse direction on the up stroke of the piston, and with the two sorts of agitators coacting together in this way effective results can be obtained in engines in which little if any improvement is to be noted with either one by itself alone.

With the high turbulence obtainable by means of the combination of stationary and reciprocating agitators and the resulting highly rapid mechanical spread of flame upon ignition, the ignition timing can be fixed, and spark advance, manual, automatic or otherwise, dispensed with. This is possible because the violence of turbulent movement of the confined gases, and the rapidity of flame spreading therein increases with increase in engine speed and vice versa, and while the spark timing is fixed, the time of reaching the pressure peak during combustion is thus caused to vary substantially directly with the engine speed.

With valve-in-head engines, the exhaust valve is liable to become unduly heated due to its failure to be swept by the incoming gases. With my invention the cyclonic agitational movement of the gases brings them into increased contact with the exhaust valve, with resulting reduction of its temperature.

The irregular surfaces of the agitator ring and the vanes thereof and of the helicoidal piston head interpose a series of obstacles to the progress of pressure waves during combustion and serve to suppress detonation by breaking up pressure waves before their progress can develop to the point of producing auto-ignition of any part or parts of the confined gases, and in this way and because of the violent movement of the gaseous materials, detonation is not encountered with use of my invention, using compression ratios of the order of 6:1 or thereabouts.

The vanes are swept by the incoming gases which absorb much of the heat stored therein during the combustion and exhaust stages of the prior cycle, providing a "hot-spot" in substantially the center of the charge for securing effective gasification of the fuel of the charge after it has been delivered to the engine cylinders. Said vanes being thus relatively cool at the time the new charge is ignited, serve in the succeeding cycle to absorb excess heat, which, unless so absorbed, would favor formation of pressure waves, auto-ignition, cracking of the fuel components, dissociation of products of combustion and the like (assumed) sources of detonation. The surfaces of the helicoidal piston head extension exert similar effects in coaction with the operation of the stationary vanes.

The violent agitation serves to secure extremely thorough admixture of the charge components and of the unscavenged exhaust gas therewith, and the resulting homogeneity is productive of improvement in the completeness and efficiency of combustion obtained.

Conversion of an old engine from low compression to high compression is readily obtained by the installation of the vaned ring and piston crown. By distributing the added metal for reducing clearance volume in the two places, a very substantial increase of compression ratio can be obtained, without, on the one hand, imposing undue restriction in the combustion chamber, or, on the other hand, adding too greatly to the weight of the moving piston.

Changes and modifications are included within the scope of the appended claims by which I intend to cover my invention as broadly as is permissible in view of the prior art.

The subject matter of my invention disclosed in this application and not claimed therein is disclosed and claimed in part in my copending application Serial No. 140,726, filed October 11, 1926, and renewed December 4, 1928, in part in my copending application Serial No. 141,289, filed October 13, 1926, and in part in my copending application Serial No. 142,231, filed October 18, 1926.

I claim:

1. In an internal combustion engine, the combination with a piston having a substantially helicoidal head of a combustion chamber having inclined vanes therein.

2. In an internal combustion engine, the combination of stationary means in the combustion chamber for producing cyclonic agitational movement of the gases upon up and down strokes of the piston, and means on the piston head for producing similar agitational movement of the gases upon up and down strokes of the piston.

3. The combination in an internal combustion engine of a ring located over the piston and having radial inclined vanes thereon, and a piston head provided with a substantially helicoidal upward extension.

4. A valve-in-head internal combustion engine having stationary interior agitation means comprising fixed inclined surfaces interposed in the path of the gases upon downward and upward movement of the piston to produce cyclonic agitational movement of the confined gases, with an upward extension from the piston head having a substantially helicoidal surface and adapted in combination with the fixed agitator surfaces to put the confined gases into a state of highly violent turbulence during ignition and combustion.

5. A valve-in-head internal combustion engine of a compression ratio of the order of about 6:1 having stationary means for producing agitation of the confined gases upon piston movement, and having means reciprocating with the piston for producing agitation of said gases in coaction with the stationary agitation means, said two means serving in conjunction to produce violent agitation and thorough admixture of the cylinder charge components and the unscavenged gases of a prior cycle.

6. Accessory means for raising the impression ratio of and securing high turbulence in an internal combustion engine, comprising a vaned ring adapted to be secured in the combustion chamber over the piston, and a crown adapted to be removably attached to the piston head.

7. In an internal combustion engine, the combination of stationary means in the combustion chamber for producing cyclonic agitational movement of the gases upon up and down strokes of the piston, and a piston head of step formation increasing in height from the periphery of the piston towards the center thereof.

8. In an internal combustion engine, an inclined vane extending from the lateral wall of the combustion chamber over the piston from substantially the edge thereof inwardly for producing cyclonic agitational movement of the gases upon up and down strokes of the piston, and a piston head of helicoidal step formation increasing in height from the periphery of the piston towards the center thereof.

In testimony whereof, I have signed my name hereto.

ARLINGTON MOORE.